United States Patent [19]
Jackson

[11] 3,783,679
[45] Jan. 8, 1974

[54] TIME BASE MEASUREMENT CIRCUIT
[75] Inventor: Jerry L. Jackson, San Antonio, Tex.
[73] Assignee: Walter A. Gunkel, San Antonio, Tex.
[22] Filed: Feb. 22, 1971
[21] Appl. No.: 117,663

[52] U.S. Cl. ................................. 73/67.7, 340/1 R
[51] Int. Cl. ......................................... G01n 29/04
[58] Field of Search .......................... 73/67.5 R, 67.6, 73/67.7, 67.8, 67.85, 67.9; 324/181; 340/1 R

[56] References Cited
UNITED STATES PATENTS

| | | | |
|---|---|---|---|
| 3,220,248 | 11/1965 | Wood | 73/67.7 |
| 3,599,478 | 8/1971 | Weinbaum | 73/67.7 |
| 3,427,866 | 2/1969 | Weighart | 73/67.9 X |
| 3,454,922 | 7/1969 | Dory | 340/1 R |
| 3,509,752 | 5/1970 | Moore | 73/67.9 |
| 3,522,580 | 8/1970 | Lynch et al. | 73/67.8 UX |
| 3,339,403 | 9/1967 | Barnes | 73/67.9 |

OTHER PUBLICATIONS

IBM Technical Disclosure Bulletin – Vol. 3, No. 2, July, 1960, Page 35, "Digital Phase Angle Meter Control" by R. P. Moore.

*Primary Examiner*—James J. Gill
*Attorney*—Hyer, Eickenroht, Thompson & Turner

[57] ABSTRACT

A time base measurement circuit is disclosed which responds to the lapsed time between two electrical signals to provide an electrical voltage proportional to this lapsed time by detecting a phase condition of the second of the electrical signals. The circuit is particularly useful in an ultrasonic inspection system which determines the relative thickness of an object being ultrasonically inspected.

1 Claim, 5 Drawing Figures

JERRY L. JACKSON
INVENTOR.

BY Hyer, Eickenroht,
Thompson & Turner

ATTORNEYS

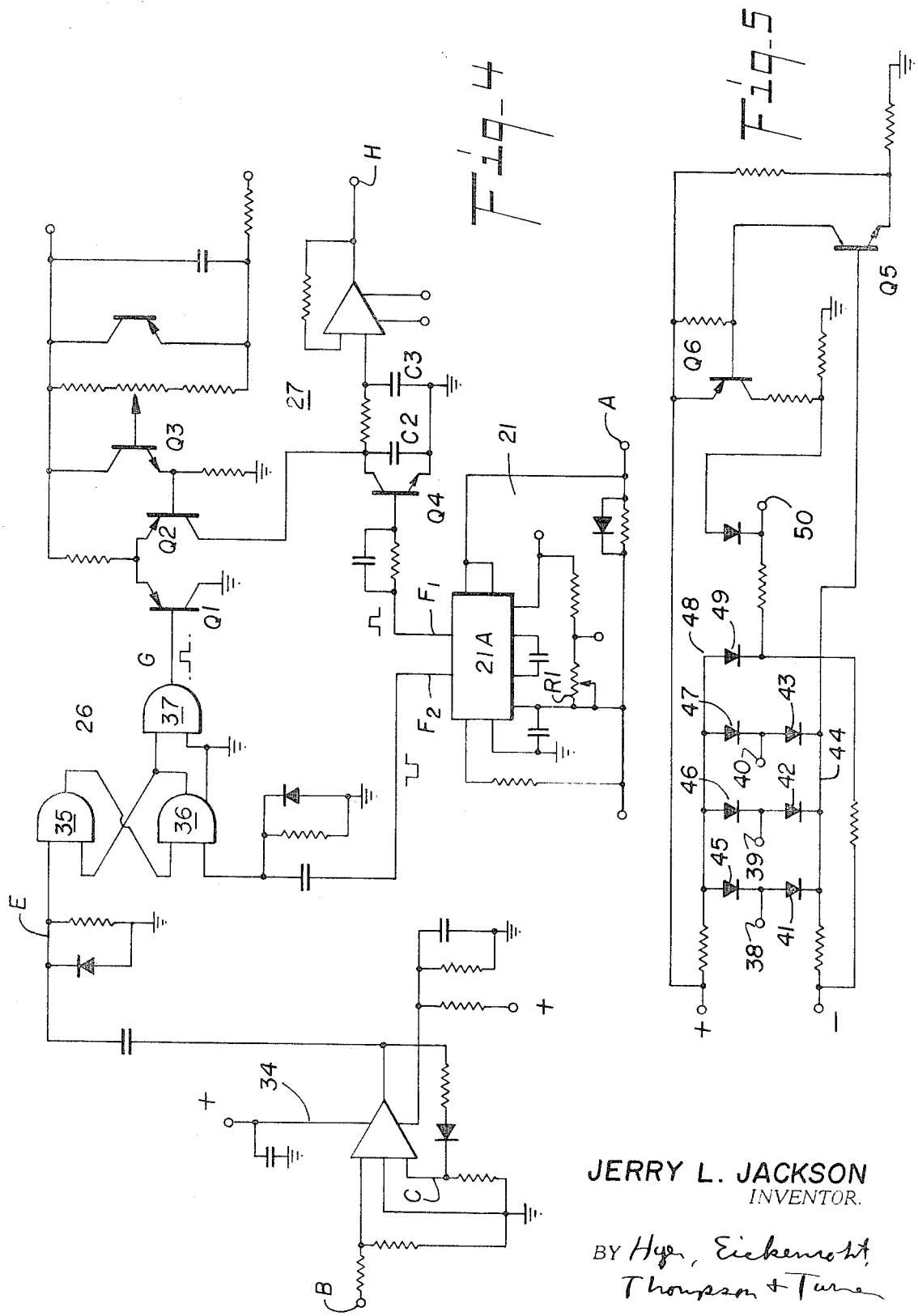

TIME BASE MEASUREMENT CIRCUIT

This invention relates to an electronic time base measurement circuit and in one of its aspects to an electrical circuit for performing such measurements in an ultrasonic inspection system.

In ultrasonic pulse-echo applications it is often desirable to measure the time required for the transmitted pulse to traverse the material under test, be reflected by the back surface or a defect within the material, and return to the receiving transducer. This time measurement may be used to calculate the thickness of the material or the location of a defect. Due to the high velocity of sound in most materials, this time measurement must be made very precisely if thickness measurements are to be performed with acceptable accuracy. For example, a timing error of one millionth of a second will result in a calculated thickness in error of about one-sixteenth inch in steel.

In conventional circuits the presence of the echo signal has generally been determined by detecting the level of the signal coming from a receiving transducer. A level selector is used to determine the arrival of an echo by sensing an increase in the level of the signal from the receiving transducer beyond a preset level. When the signal exceeds the threshold, the level selector responds and stops a clock or counter which had been started by the ultrasonic transmitting pulse with a suitable delay for the amount of time required for an acoustic signal to propagate through the various coupling members that are present in a normal transducer structure. The output of the clock is thus a measure of the time the acoustic signal travels in the material under test. However, detection of the amplitude or level of the echo signal is not satisfactory because there are many uncontrollable factors that govern the echo amplitude so any practical instrument must be designed to operate over a range of signal amplitudes. Thus, there is an uncertainty factor in the determination of echo time arrival that places an absolute limit on the accuracy that may be obtained by this method.

One conventional approach to improving accuracy is to raise the natural frequency of the transducer. The decrease in echo signal rise time associated with a higher natural frequency serves to reduce the uncertainty factor proportionally. These conventional pulse-echo systems utilize highly damped transducers and wide band width amplifiers which necessarily increase the cost and complexity of such a system while still not providing entirely satisfactory results. Also, use of relatively higher transducer frequencies to obtain sufficient accuracy is not desirable because at lower transducer frequencies improved acoustic properties are obtained. Also, use of a lower pulse-echo frequency permits use of narrow band amplifiers which also improve the signal to noise ratio of the system without serious effects on accuracy. The use of the lower frequency also increases the acoustic coupling between the transducers and an object being inspected, greatly simplifies the construction of the transducers, and simplifies the electronics.

It is thus an object of this invention to provide a time base measurement circuit which permits the use of relatively low ultrasonic transducer frequencies.

Another object of this invention is to provide such a circuit which permits recognition of the echo signal without relying entirely on echo signal level detection.

Another object of this invention is to provide such a circuit which results in the elimination of the uncertainty factor in the determination of echo time arrival attendant with reliance on echo signal level detection.

Another object of this invention is to provide such a circuit which permits the use of relatively simple transducers which may be relatively undamped.

An object of this invention is to provide such a circuit which permits highly accurate determination of echo arrival time while employing relatively inexpensive and simple electronic components.

These and other objects of this invention are accomplished by detecting a phase condition of the echo signal, such as a zero crossover, which phase condition is a precise indicator of the arrival of the echo signal and is independent of echo signal amplitude. Thus, in utilization of this invention, whether in detecting echo arrival or in other time base measurements, a clock or a digital counter, which had been previously started at the beginning of the time period being measured, can be stopped when the phase condition is detected. Also, determination of this phase condition of the echo signal can be used to stop the linear charge on a capacitor which charge began at the beginning of the period being measured. In this manner an analog voltage can be provided which is proportional to the time period measured. This analog signal can be directly read out on a high impedance meter or be used to drive a chart recorder.

In the drawings:

FIG. 4 is a detailed schematic of the ultrasonic inspection apparatus of FIG. 1; and FIG. 5 is a detailed schematic of a circuit for combining a plurality of analog signals to provide an output equal to the smallest of such signals.

Figure 1:
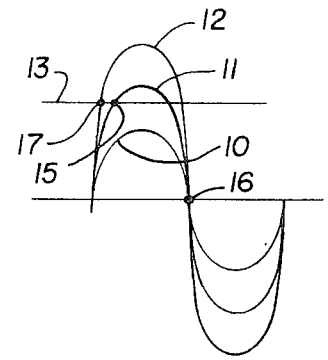
FIG. 1 is a wave-form diagram illustrating the concept of this invention.

Referring to the drawings, FIG. 1 shows three sinusoidal wave forms 10, 11 and 12, each having succeedingly larger amplitudes but all being in phase. In determining the presence or arrival of a signal such as the echo signal from a transducer utilized in ultrasonic inspection systems, it has been customary to use a level detector to determine presence of a signal of a preset level, such as the level represented by the line 13 in FIG. 1. However, as illustrated in FIG. 1, line 13 crosses wave form 12 at point 17 and wave form 11 at point 15. Thus, even though these signals arrive at the same time as indicated by the fact that they are in phase, detection of the points 17 and 15 does not provide an accurate measurement of their arrival time. Thus, it has been necessary to utilize higher transducer frequencies to reduce the rise time slope of the incoming signals.

However, since wave forms 11 and 12 are in phase, detection of a phase condition of these signals, such as by determining zero crossover at point 16, provides an accurate determination of the arrival time of the signals at the transducer relative to the arrival time of other such signals representing different conditions in the object being inspected. It can be demonstrated mathematically that the phase condition of the echo signal is independent of the amplitude of the echo signal.

Figure 2:
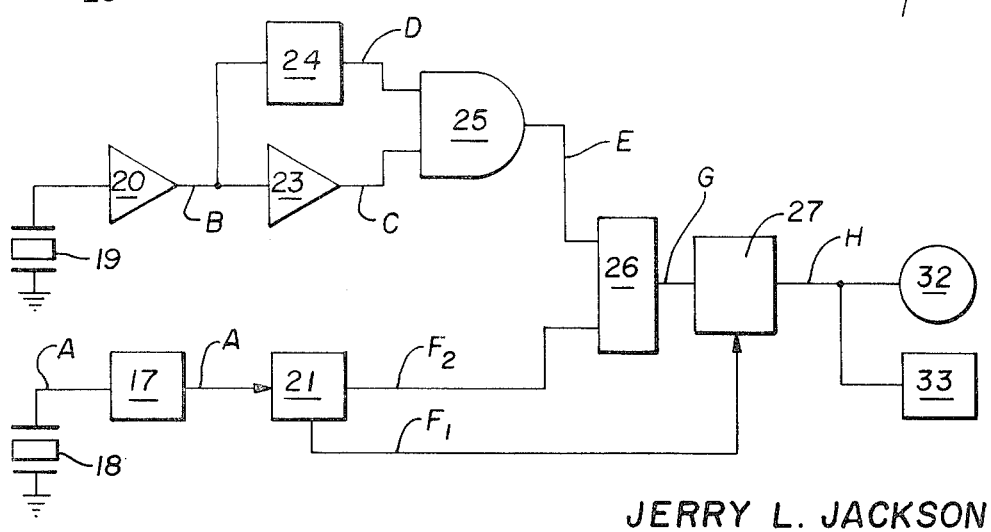
FIG. 2 is a block diagram of a preferred circuit utilizing this invention in an ultrasonic inspection apparatus.

FIG. 2 illustrates a block diagram of a preferred electronic circuit utilizing this invention which is particularly adaptable for use in ultrasonic inspection such as disclosed in the copending patent application of Walter A. Gunkel, assignee of this patent application, filed concurrently with this application and entitled "Ultrasonic Inspection System." Of course, the principles utilized in this circuitry also can be utilized to determine the time base between electrical signals other than the pulse and echo signals utilized in such an ultrasonic inspection system.

In FIG. 2 an electronic pulser 17 is utilized to periodically drive a transmitting transducer 18 at, for example, 2,000 pulses per second. These pulses are illustrated by the wave form A in FIG. 3. Some time after transducer 18 is excited, a receiving transducer 19 receives an echo signal, and this signal is converted from an acoustic signal by transducer 19 to an electrical signal and amplified in a suitable narrow band amplifier 20 to provide the wave form B in FIG. 3. The time lapse between initiation of pulse A and the receipt of the echo signal B is proportional to the thickness of an object being ultrasonically inspected and to the time of travel of the acoustic energy waves through the various coupling means present in the transducer structure. In order to compensate for the delay in passing the acoustical signals through these coupling means, a delay circuit 21 is connected to pulser 17 and responds to pulse A to provide the outputs $F_1$ and $F_2$ in FIG. 3, each having a pulse width substantially equal to the time delay in passing through the various coupling mediums but being of opposite polarity. Since this delay period is a fixed amount under normal circumstances, the accuracy of determination of the time of receipt of the echo signal B is not affected by this delay period.

Figure 3:
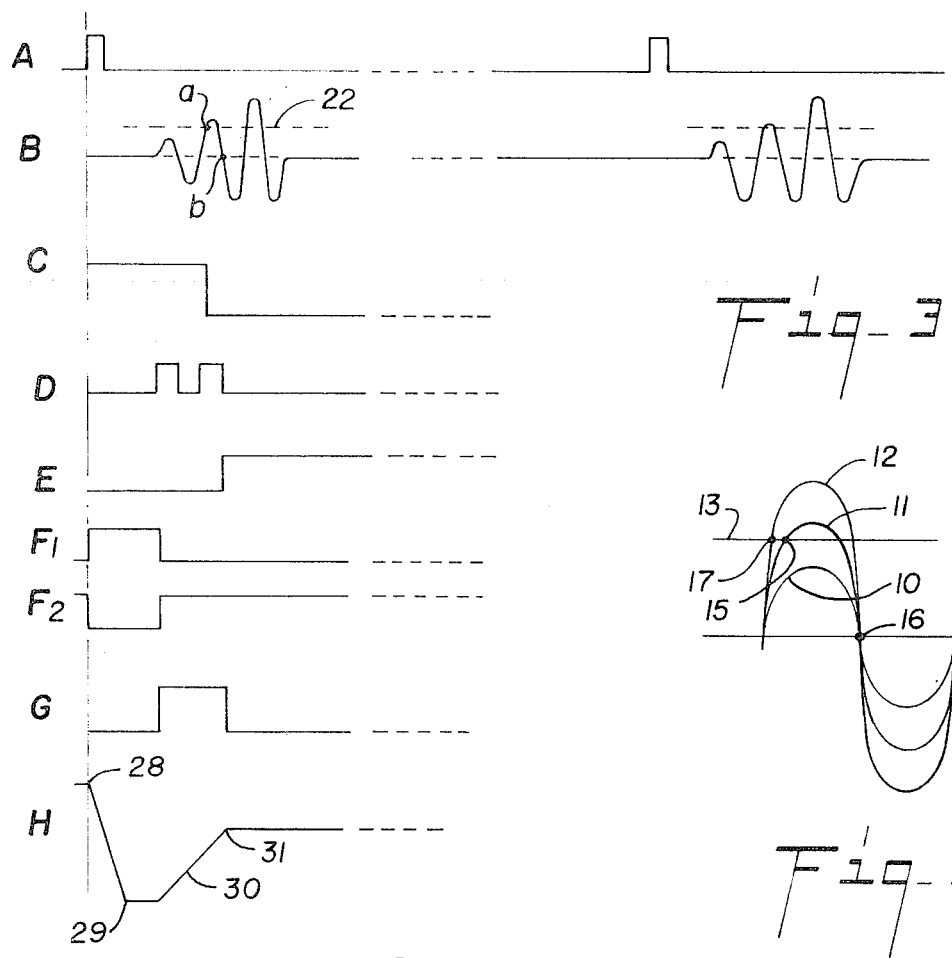
FIG. 3 is a timing diagram relating to the circuit of FIG. 1.

The period of time between transmitting of drive pulse A and receipt of the echo signal B is relatively short, for example, in the order of 10 microseconds as compared to a time lapse of approximately 500 microseconds between pulses A. During the period in which the echo signal is not received, receiving transducer 19 will generate signals in response to spurious noise and undamped oscillations. These signals will generally be of a low value in amplitude, and for this reason, the voltage level of signal B can be sensed to indicate the arrival of the echo signal of larger amplitude than such spurious signals. As illustrated in FIG. 3, this level can be set at the voltage level 22 so that output signals from amplifier 20 below this level will not affect the system. Determination of the voltage level in this manner, however, does not provide the sole determination of the presence of the echo signal for the purposes of this invention, but is used to improve the discrimination of the circuit.

For the purpose of determining presence of echo signals exceeding the value of level 22, a level detector 23 is provided, and its output is shown as the wave form C in FIG. 3. As illustrated in the preferred embodiment of the circuit of FIG. 2, the output of level detector 23 is normally high until a signal exceeding the preset input level is received, such as is illustrated by point a on signal B in FIG. 3, at which time the output (wave form C) of level detector 23 becomes low.

The output from amplifier 20, i.e., wave form B, is also conducted through a zero crossover detector 24. As illustrated by the wave form D in FIG. 3, which is the output of zero crossover 24, the voltage level D rises in response to positive going edge of input signal B and goes negative in response to the negative falling edge of signal B, such as at point b on wave form B. Thus, the leading and trailing edges of wave form D represent the points in time at which signal B crosses zero. While zero crossover detection is used in this example as the indication of a phase condition of signal B, other phase conditions of signal B could be utilized to determine the presence of the echo signal. For example, the peaks of the signal could be detected.

The outputs of level detector 23 and zero crossover detector 24 are conducted to separate inputs of an OR circuit 25. If either one of the input signals D or C is high, the output of OR circuit 25, illustrated as wave form E in FIG. 3, is low. However, when both inputs D and C are low, then the output of OR circuit 25 goes high, as also illustrated by wave form E in FIG. 3. Thus, the output of level detector 23 (wave form C) will go to a low value when the level of the leading edge of signal B exceeds level 22 at point a, and the output of zero crossover detector (wave form D) will go low in response to the succeeding zero crossover of echo signal D at point b, thus causing the output E to go high. The change of state of the output E from OR circuit 25 is thus an accurate indication of arrival of the echo signal, and outputs $F_1$ or $F_2$ from delay circuit 21 provide an indication of the time that the pulse A was sent and an indication of the end of the necessary delay period. The time lapse between the end of this delay period and arrival of the echo signal is thus proportional, in the ultrasonic inspection system under consideration, to the wall thickness of the object being inspected adjacent transducers 18 and 19.

Pulses E and $F_2$ are conducted to the input of a start-stop circuit 26 which provides a time measurement window pulse G at its output. Circuit 26 is thus turned on in response to receipt of a start time period signal $F_2$ and turned off in response to the receipt of a stop time period signal E, and the width of pulse G then is substantially equal to the time period being measured. This pulse G may be utilized to start a digital counter when it goes high and to stop it when it goes low to provide a digital readout of this time base measurement. Also, it may be converted to an electrical analog signal which is proportional to the duration of the time period being measured.

This analog conversion may be made in the preferred form of this invention by the circuit 27. Circuit 27 may include a voltage storage circuit which provides a linear change in voltage as a function of time to provide the wave form H in FIG. 3 which represents the output analog signal from circuit 27. The output H of circuit 27 may be at some high value 28 at the time of occurrence of pulse A, and pulse $F_1$ is produced by delay circuit 21 and conducted to voltage storage circuit 27 to cause it to reset to a low value 29 on wave form H prior to receipt of pulse G. Because the delay time is a fixed value, the time to reset to voltage level 29 must be short enough so that the voltage at the output of circuit 27 will be at level 29 prior to the time of receipt of pulse G. The receipt of pulse G will then cause circuit 29 to turn on and begin its charge period at a linear rate as illustrated by the slope 30 on pulse H. When pulse G again changes state, indicating the arrival of the echo signal, voltage storage circuit 27 is turned off, for example, at the voltage level 31, and this voltage level is retained until the receipt of the next pulse $F_1$ which resets the circuit. The voltage level 31 is directly proportional to the time lapse between receipt of the delayed pulse $F_2$ and the zero crossover pulse E and can be read on a high impedance meter 32 or on an analog recorder 33.

Referring to FIG. 4, a detailed schematic of the preferred form of the circuits described in connection with FIG. 2 is illustrated. In this preferred circuitry, a sense amplifier 34 is provided which responds to echo signal B at one input to provide signal E indicating the presence of an echo signal. Thus, amplifier 34 performs the functions of level detector 23, zero crossover 24, and OR circuit 25, and provides the output E at a time after receipt of signal B of at least a predetermined voltage level and the next succeeding zero crossover of signal B. The output of amplifier 34 is connected through a capacitor $C_1$ to OR circuits 35 and 36, which are connected to form a latch, and which in turn drive OR circuit 37. OR circuits 35, 36 and 37 together function as start-stop circuit 26 to provide the time measurement electrical signal G at the output of OR circuit 37 in response to a start signal $F_2$ from delay circuit 21 and stop signal E from amplifier 34. One input of OR circuit 37 is grounded, and this circuit will turn on and off and remain either on or off in response to receipt of a signal from OR circuit 36, the output of which is connected to the other input of OR circuit 37, to provide the time measurement signal G.

Delay circuit 21 which provides delay signals $F_1$ and $F_2$ may be a one-shot multivibrator 21A which is connected at one of its inputs to driver 17 and is caused to switch states in response to the receipt of signals from driver 17. Circuit 21 has two outputs of opposite polarity to provide delay signals $F_1$ and $F_2$. The delay period should be very stable to ensure that accurate timing is provided and may be adjusted by a potentiometer $R_1$ in delay circuit 21.

Voltage storage circuit 27 is illustrated in FIG. 4 as including transistors $Q_1$, $Q_2$, $Q_3$ and $Q_4$ and associated components, and capacitors $C_2$ and $C_3$. Transistors $Q_2$ and $Q_3$ form part of a constant current source which when operable charges capacitor $C_2$ at a linear rate as represented by slope 30 in wave form H. The base of transistor $Q_1$ is connected to the output of OR circuit 37 and responds to pulse G to turn source 27 on upon arrival of pulse G and to turn it off upon fall off of pulse G, such as when the level 31 is reached. Transistor $Q_4$ shunts capacitors $C_2$ and $C_3$ and, in response to receipt of delay pulse $F_2$, causes $C_2$ to discharge from voltage level 28 to voltage level 29.

As previously noted, the analog output H may be used to drive an analog recorder, as disclosed in the aforementioned patent application of Walter A. Gunkel. Also, as disclosed in that application, if a plurality of inspection transducers are utilized to simultaneously inspect adjacent sections of an object being inspected and provide a plurality of electrical signals such as signal H, each proportional to the wall thickness of the object being inspected in one of said adjacent areas, then the signals can be combined by utilizing the circuit illustrated in FIG. 5 to provide an analog signal proportional to either the smallest or the largest of these signals. The circuit in FIG. 5 is illustrated as including three strings of two series-connected diodes connected between sources of equal voltages of opposite polarity, and input terminals 38, 39 and 40 are connected for receipt of suitable time base voltage signals to the junction of each of the series-connected diodes. Diodes 41 through 43 are connected on the negative side of the diode strings by a common lead 44, and diodes 45 through 47 are connected to the positive side of the diode strings by a common lead 48. Current flows from lead 48 to lead 49 through the diode strings. Since each of the inputs 38 through 40 is connected between two of the series-connected diodes, the lowest negative input voltage at one of the inputs to the diodes will determine the voltage at line 48. This voltage is then conducted through a diode 49, which compensates for the loss of voltage in the circuit described, to an output terminal 50. Thus the voltage at output terminal 50 will be proportional to the smallest of the signals received at inputs 38 through 40.

Line 44 is also connected to the base of a transistor $Q_5$. Thus, if the signal level at one or more of the inputs 38 through 40 is of sufficient value, $Q_5$ will conduct, and the voltage level at output 50 will change to a predetermined higher value determined by a voltage control circuit including transistor $Q_6$ and associated components. This high level signal can be used to indicate, for example, the presence of a weld on an object being inspected. Thus, by proper setting of the threshold level of transistor $Q_5$, the circuit of FIG. 5 can be made to respond to the smallest of the received signals, when all of these signals are below a preset level, and provide an indication of a relatively higher level input when one or more of the received signals exceeds this preset level.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A time base measurement circuit for providing a time measurement electrical signal proportional to the time required for an ultrasonic energy signal to pass into and then out of an object being inspected, comprising, in combination: a transmitting transducer providing said ultrasonic energy signal; drive means for periodically driving said transmitting means; delay means connected to said drive means and responding thereto to provide a start time period signal at a time substantially equal to the time when said transmitted acoustical energy signal enters the object being inspected; a receiving transducer responding to receipt of acoustical energy from such an object being inspected to provide an echo signal; echo signal detection means responding to the amplitude and phase of said echo signal to provide a stop time period signal only upon occurrence of a predetermined phase condition of said echo signal, said echo signal detection means including a level detector and a zero crossover detector, and means for combining the outputs of said level detector and said zero crossover detector to provide said stop time period signal, said combining means including an OR circuit connected at one input to said level detector; means responding to said start and stop time period signals to provide said time measurement electrical signal, the duration of which is substantially equal to the time being measured; analog means for converting said time measurement electrical signal to an analog signal proportional to the duration of the time period being measured, said analog means including voltage storage means responding to said start time period signal and increasing in voltage at a substantially linear rate from a low voltage value at the time of receipt of said start time period signal to a higher voltage to provide said analog signal at the time of receipt of said stop time period signal, said voltage storage means comprising a capacitor and further including a constant current source for charging said capacitor at a linear rate, said constant current source turning on in response to receipt of said start time period signal and turning off in response to the receipt of said stop time period signal, and said voltage storage means being connected to said drive means to respond to the excitation of said transmitting transducer to discharge said capacitor to said low voltage value prior to receipt of said start time period signal; and means for comparing the level of said analog signal with a plurality of similar signals to provide an output signal proportional to the smallest of the compared signals.

* * * * *